US011489788B2

(12) United States Patent
Zheng et al.

(10) Patent No.: US 11,489,788 B2
(45) Date of Patent: Nov. 1, 2022

(54) INTERCONNECTION NETWORK WITH ADAPTABLE ROUTER LINES FOR CHIPLET-BASED MANYCORE ARCHITECTURE

(71) Applicant: The George Washington University, Washington, DC (US)

(72) Inventors: Hao Zheng, Arlington, VA (US); Ke Wang, Alexandria, VA (US); Ahmed Louri, Vienna, VA (US)

(73) Assignee: The George Washington University, Washington, DC (US)

( * ) Notice: Subject to any disclaimer, the term of this patent is extended or adjusted under 35 U.S.C. 154(b) by 0 days.

(21) Appl. No.: 17/085,454

(22) Filed: Oct. 30, 2020

(65) Prior Publication Data

US 2021/0344618 A1 Nov. 4, 2021

Related U.S. Application Data

(60) Provisional application No. 63/019,670, filed on May 4, 2020.

(51) Int. Cl.
*H04L 49/15* (2022.01)
*H04L 41/0813* (2022.01)
(Continued)

(52) U.S. Cl.
CPC .............. *H04L 49/15* (2013.01); *H04L 12/44* (2013.01); *H04L 41/0813* (2013.01); *H04L 41/12* (2013.01); *H04L 45/60* (2013.01)

(58) Field of Classification Search
CPC ..... H04L 49/15; H04L 12/44; H04L 41/0813; H04L 41/12; H04L 45/60
See application file for complete search history.

(56) References Cited

U.S. PATENT DOCUMENTS

2004/0214576 A1* 10/2004 Myers ................... H04L 69/165
455/445
2007/0008927 A1* 1/2007 Herz ....................... H04L 45/30
370/331
(Continued)

OTHER PUBLICATIONS

Umit Y. Ogras, et al., "Application-Specific Network-on-Chip Architecture Customization via Long-Range Link Insertion", 2005, 8 pgs.
(Continued)

*Primary Examiner* — Samina F Choudhry
(74) *Attorney, Agent, or Firm* — Blank Rome LLP

(57) ABSTRACT

An interconnection network for a processing unit having an array of cores. The interconnection network includes routers and adaptable links that selectively connect routers in the interconnection network. For example, each router may be electrically connected to one or more of the adaptable links via one or more multiplexers and a link controller may control the multiplexers to selectively connect routers via the adaptable links. In another example, adaptable links may be formed as part of an interposer and the link controller selectively connect routers via the adaptable links in the interposer using interposer switches. The adaptable links enable the interconnection network to be dynamically partitioned. Each of those partitions may be dynamically reconfigured to form a topology.

23 Claims, 14 Drawing Sheets

(51) Int. Cl.
  *H04L 12/44* (2006.01)
  *H04L 41/12* (2022.01)
  *H04L 45/60* (2022.01)

(56) References Cited

U.S. PATENT DOCUMENTS

| | | | | |
|---|---|---|---|---|
| 2007/0073883 | A1* | 3/2007 | Chafle | H04L 43/00 709/226 |
| 2009/0303880 | A1* | 12/2009 | Maltz | H04L 45/24 370/235 |
| 2013/0017796 | A1* | 1/2013 | Milner | H04W 24/02 455/67.13 |
| 2017/0220499 | A1* | 8/2017 | Gray | G06F 13/36 |
| 2019/0372911 | A1* | 12/2019 | Kumar | G06F 15/173 |
| 2020/0090808 | A1* | 3/2020 | Carroll | H04L 67/12 |

OTHER PUBLICATIONS

Chia-Hsin O. Chen, et al., "SMART: A single-Cycle Reconfigurable NoC for SoC Applications", IEEE, 2013, 6 pgs.

N. E. Jerger, et al., "NoC Architectures for Silicon Interposer Systems", 2014 47th Annual IEEE/ACM International Symposium on Microarchitecture, IEEE Computer Society, 2014, 13 pgs.

M. M. Kim, et al., "Polymorphic On-Chip Networks", International Symposium on Computer Architecture, IEEE Computer Society, 2008, 12 pgs.

R. Parikh, et al., "Power-Aware NoCs Through Routing and Topology Reconfiguration", IEEE, Jun. 2014, 6 pgs.

M. B. Stensgaard, et al., "ReNoC: A Network-on-Chip Architecture with Reconfigurable Topology", Second ACM/IEEE International Symposium on Networks-on-Chip, IEEE Computer Society, 2008, 10 pgs.

M. A. A. Faruque, et al., "Configurable Links for Runtime Adaptive On-Chip Communication", IEEE, 2009, 6 pgs.

* cited by examiner

INTERCONNECTION NETWORK WITH ADAPTABLE ROUTER LINES FOR CHIPLET-BASED MANYCORE ARCHITECTURE

CROSS-REFERENCE TO RELATED APPLICATIONS

This application claims priority to U.S. Prov. Pat. Appl. No. 63/019,670, filed May 4, 2020, which is hereby incorporated by reference.

FEDERAL FUNDING

This invention was made with government support awarded by the National Science Foundation under CCF-1547035 and CCF-1702980. The government has certain rights in the invention.

BACKGROUND

Manycore processors consist of numerous independent cores (e.g. CPUs, GPUs, and accelerators), and thus are efficient for a high degree of parallel processing. Manycore processors may be realized as a single, monolithic processing unit with many cores. Alternatively, a manycore processor may be realized using a chiplet-based design.

FIG. 1 is a diagram of a chiplet-based manycore processing unit 100.

As shown in FIG. 1, the chiplet-based manycore processing unit 100 includes a number of smaller chips, called chiplets 140, that are placed side-by-side and interconnected by chiplet-based interconnect such as an interposer 180. Each chiplet 140 may include a number of cores 160. The cores 160 may be central processing units (CPUs), graphical processing units (GPUs), accelerators, or other memory modules. The cores 160 within each chiplet 140 may be interconnected by on-chip interconnection fabric called a network-on-chip (NoC). The interconnection fabric consists of routers and links. Additionally, the interposer 180 may provide an electrical interface for routing between the chiplets 140. Each chiplets 140 may be connected to the interposer 180, for example, via micro-bumps 182. Prior art interposers 180 adopt passive interposers 180 that only include preconfigured links (e.g., wires) that enable data transmission only along those preconfigured connection paths. Alternatively, some prior art interposers 180 are active interposers 180 that include network logic such as links and routers, form an additional on-chip communication fabric, which enables communications between the chiplets 140. Again, however, those active interposers 180 only include preconfigured links (e.g., wires) and routers that enable those preconfigured communication paths.

The arrangement of the communications paths between the cores 160 is referred to as a topology. Topologies may include connections between cores 160 in the same chiplet 140 and/or connections between cores 160 located in multiple different chiplets 140. Example topologies include mesh, cmesh, ring, and tree. However, the number of possible topologies is limited by the number of possible connections between the cores 160.

FIG. 2 is a diagram of an example of a conventional mesh topology 200. As shown in FIG. 2, a mesh topology 200 includes a router 250 for each core 160. Each router 250 is connected to each adjacent router 250 via mesh links 224 to form a mesh network. (The example topology shown in FIG. 2 includes an array of sixteen routers 250 for an array of sixteen cores 160. However, as one of ordinary skill in the art would recognize, a processing unit 100 may include any number of cores 160 and routers 250.)

FIG. 3 is a diagram of another example of a conventional topology, in this example a torus topology 300. Similar to the mesh topology 200, the torus topology 300 includes an array of routers 250 with mesh links 224 between each adjacent router 250. (Again, the example topology shown in FIG. 3 includes an array of sixteen routers 250 for an array of sixteen cores 160. However, a processing unit 100 may include any number of cores 160 and routers 250.) In addition to the mesh links 224, the torus topology 300 includes express links 328 that connect non-adjacent routers 250, allowing packets to bypass the intermediate routers 250. Express links 328 may be placed to bridge any pair of routers 250. In the case of torus topology 300, peripheral routers 250 are connected horizontally and vertically by multiple wrap-around express links 328. The wrap-around express links 328 reduce the network diameter (improving network latency) and increase the number of links 224 and 328 across the network, improving bi-section bandwidth and throughput.

The topology is of a conventional network-on-chip (NoC) system is generally static. Static NoCs are often optimized for a given communication performance and are therefore inefficient in satisfying the various communication requirements of different applications running simultaneously. The mismatch between various communication demands and restricted NoC flexibility inevitably confines communication performance and energy efficiency.

Reconfigurable NoCs were introduced to remedy the sub-optimal on-chip communication by providing application-specific NoC topologies. Existing reconfigurable NoCs include predetermined communication links between nodes and a switching mechanism to enable and disable some or all of the predetermined communication links. Because those predetermined communication links are statically configured based on communication task graphs before application execution, those predetermined communication links cannot be changed until execution completes.

Additionally, all of existing reconfigurable NoCs (e.g., mesh links 224 and express links 328) are designed for single application execution, where the application mapping is required to fit the NoC size. In other words, existing reconfigurable NoCs cannot adapt to dynamic application mapping. As a result, these schemes have limited applicability for modern manycore architectures where multiple applications are running. Modern software applications are often dynamically allocated into different regions of compute and memory resources, thus leading to frequently changed application mapping and diverse regional communication behavior.

Accordingly, there is a need for versatile and flexible communications paths that enable the manycore architecture to be partitioned in order to allocate a collection of cores, memory modules, routers, and links within different regions of the manycore architecture to different applications running concurrently. Additionally, there is a need for versatile and flexible interconnection design with communication paths that can be dynamically routed from each node to any of a number of different nodes. Any of the partitioned interconnection network can be configured as any of topologies supporting diverse application behaviors.

SUMMARY

In order to overcome those drawbacks in the prior art, an interconnection network for a processing unit having an array of cores is provided. The interconnection network can be dynamically partitioned and each partition can be reconfigured to form the topology that most efficiently performs the software functions assigned to that partition.

The interconnection network includes routers and adaptable links that selectively connect routers in the interconnection network. For example, each router may be electrically connected to one or more of the adaptable links via one or more multiplexers and a link controller may control the multiplexers to selectively connect routers via the adaptable links. In another example, adaptable links may be formed as part of an interposer and the link controller selectively connects routers via the adaptable links in the interposer using interposer switches. The adaptable links may include link switches that close to connect two routers and open to segment the adaptable link into two segments that can each selectively connect two of the routers.

The interconnection network (or an individual partition) may be reconfigured based on characteristics of the software application to be executed by the processing unit or partition. For instance, if the software application is not traffic intensive, network concentration may be performed (for example, by reconfiguring the interconnection network or partition to form a cmesh topology). If the software application is traffic intensive but not memory intensive, express links may be placed between non-adjacent routers (for example, by reconfiguring the interconnection network or partition to form a torus topology). Finally, if the software application is traffic intensive and memory intensive, the interconnection network or partition may be reconfigured to form a tree-like topology.

BRIEF DESCRIPTION OF THE DRAWINGS

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which.

DETAILED DESCRIPTION

Figure 1:
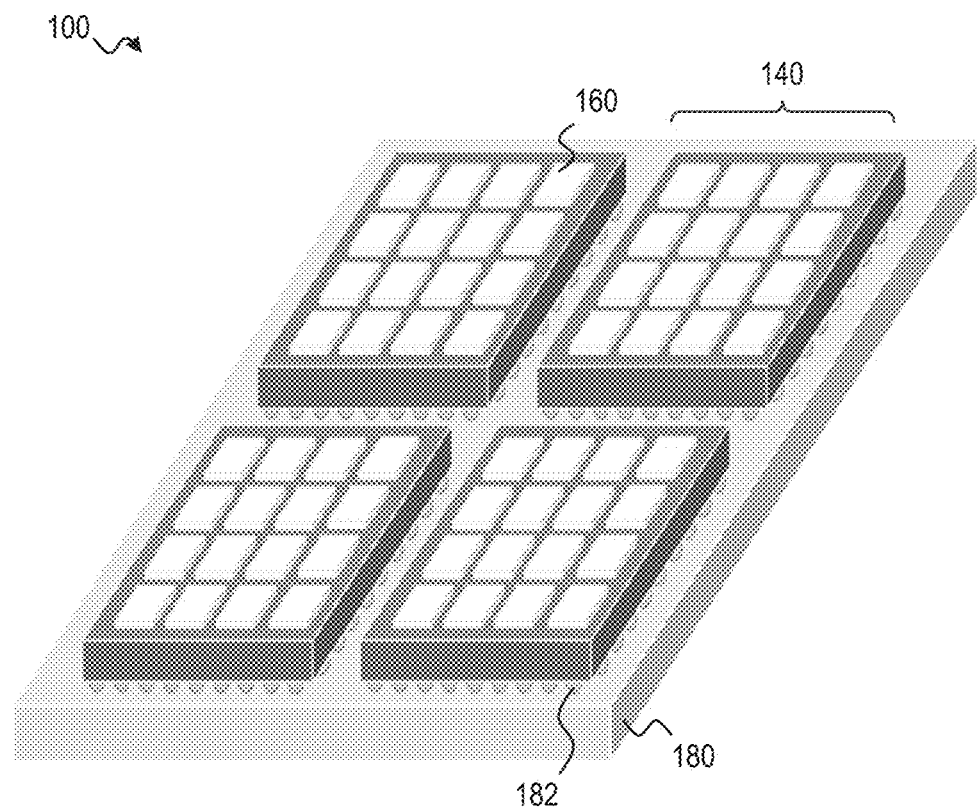
FIG. 1 is a diagram of a chiplet-based manycore processing unit.
Figure 2:
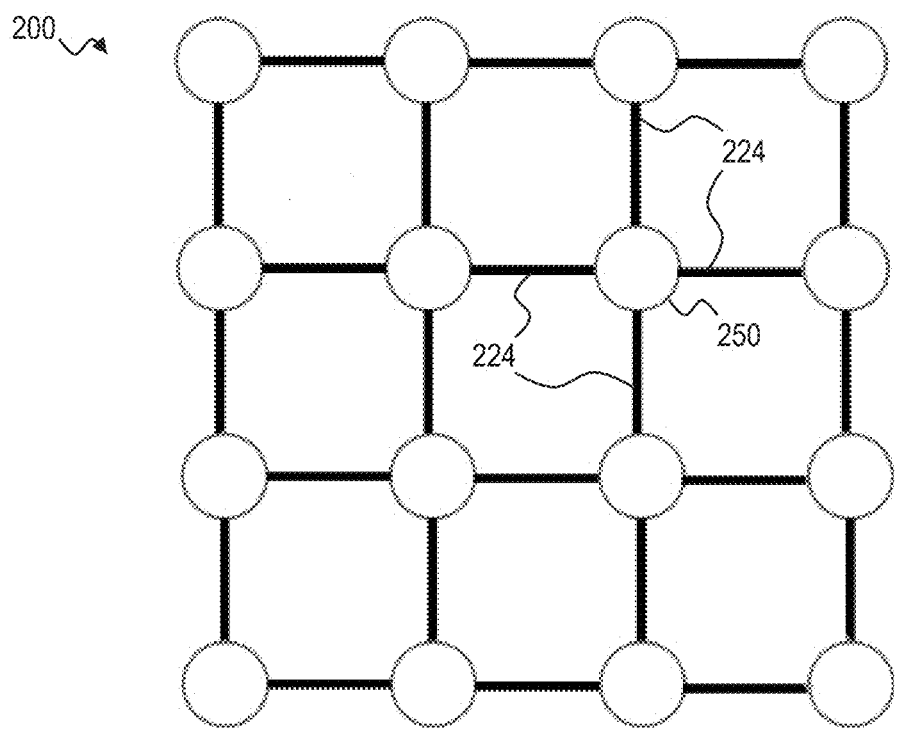
FIG. 2 is a diagram of a conventional mesh topology.
Figure 3:
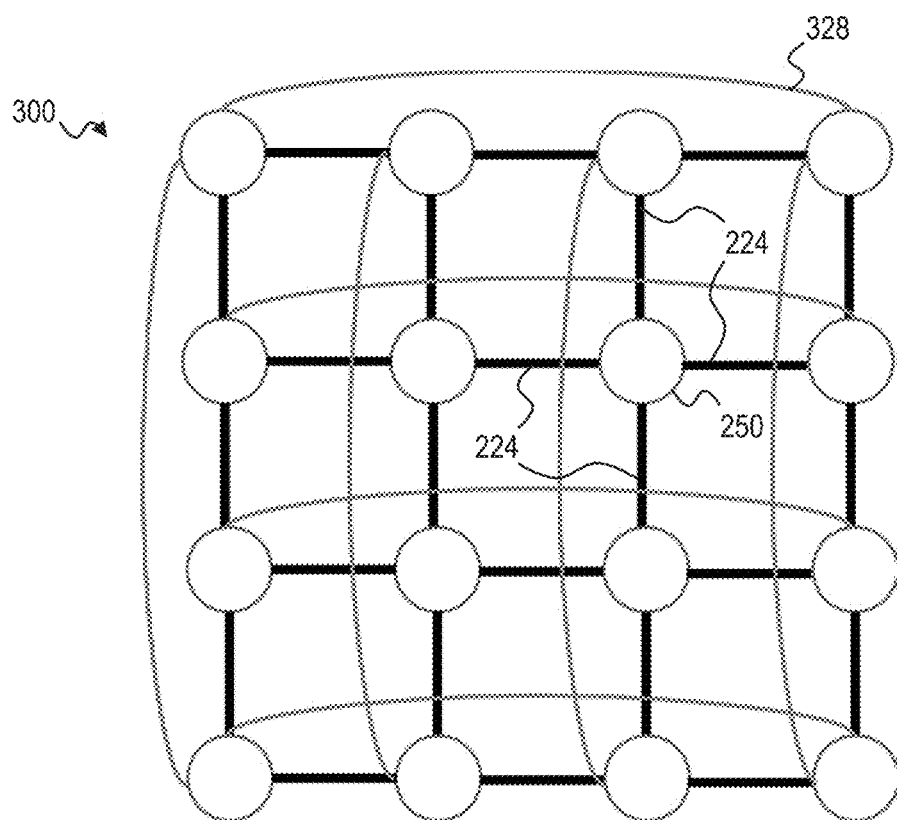
FIG. 3 is a diagram of a conventional torus topology.

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

Figure 4A:
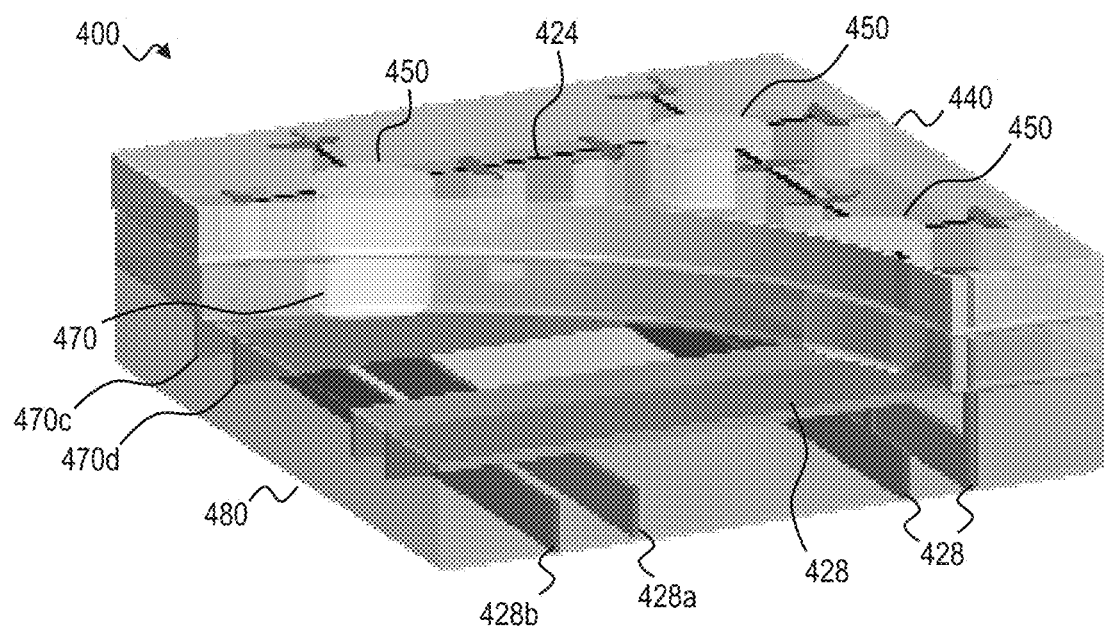
FIG. 4A is a three-dimensional view of an interconnection network according to an exemplary embodiment.
Figure 4B:
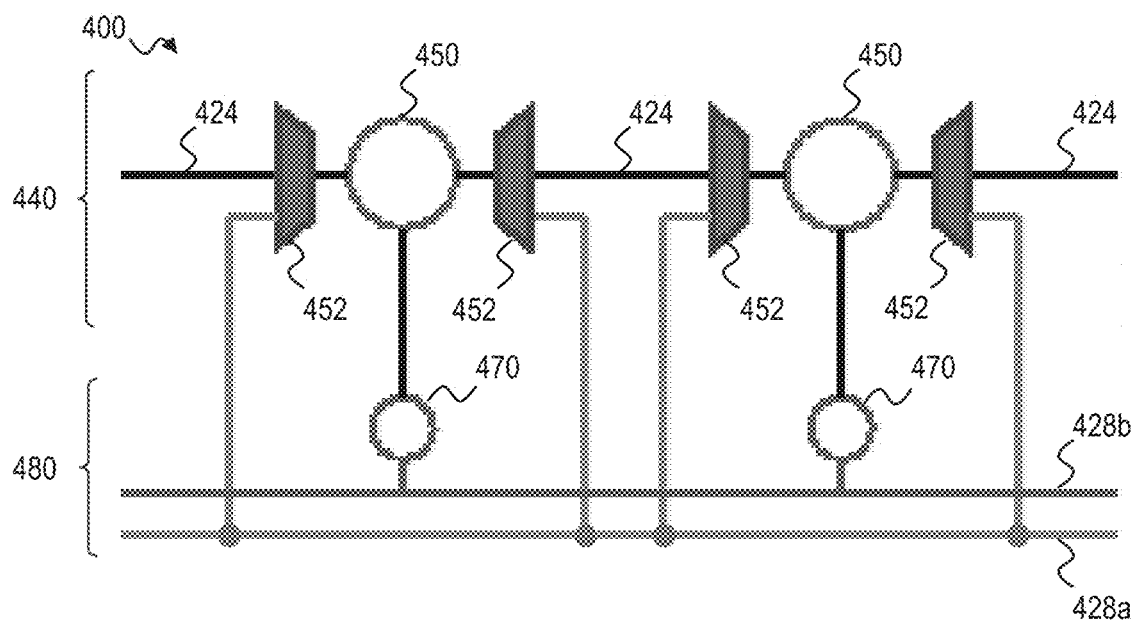
FIG. 4B is a cross-sectional view of the interconnection network according to an exemplary embodiment.
Figure 4C:
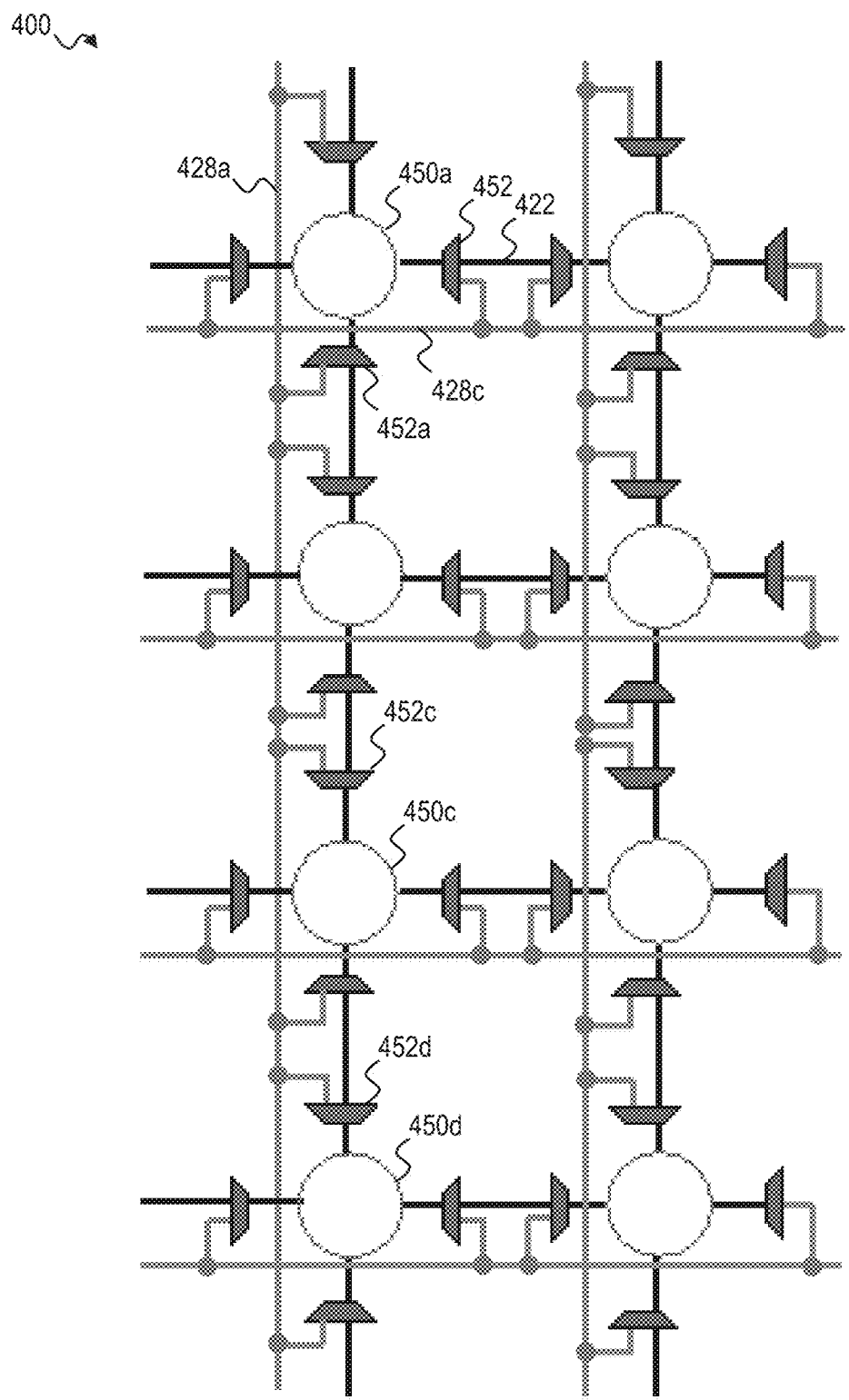
FIG. 4C is a top-down view of the interconnection network according to an exemplary embodiment.

FIG. 4A is a three-dimensional view of an interconnection network 400 according to an exemplary embodiment. FIG. 4B is a cross-sectional view of the interconnection network 400. FIG. 4C is a top-down view of the interconnection network 400.

As shown in FIGS. 4A and 4B, the interconnection network 400 includes a chiplet 440 and an interposer 480. The chiplet layer 440 includes an array of routers 450 for an array of cores 160 (not shown). Each router 450 is electrically connected to the adjacent routers 450 via mesh links 422. Each router 450 is electrically connected to each mesh link 422 via a multiplexer 452. And each router 450 is electrically connected to the interposer 480 via an interposer switch 470.

Unlike conventional NoCs, the interconnection network 400 includes adaptable links 428. In the example shown in FIG. 4A, each router 450 is located above four adaptable links 428, including two adaptable links 428 (e.g., adaptable links 428a and 428b) that connect a column of routers 450 and a second layer with two adaptable links 428 (e.g., adaptable links 428c and 428d) that extend in a direction perpendicular to the adaptable links 428 of the first layer and connect a row of routers 450. Each router 450 is electrically connected to the four adaptable links 428 patterned below the router 450 either via the interposer switch 470 or one or two multiplexers 452.

As shown in the cross-sectional view of FIG. 4B, each router 450 may be electrically connected to the adaptable link 428a via two of the multiplexers 452. (A router 450 at the end of the column or row (not shown) would be connected to the adaptable link 428a via only one multiplexer 452.) And each router 450 is electrically connected to the adaptable link 428*b* via the interposer switch 470 associated with that router 450.

As shown in the top-down view of FIG. 4C, each router 450 is connected to each adjacent router 450 via a multiplexer 452 and a mesh link 422. Patterned beneath the router 450*a* is an adaptable link 428*a* connecting the column of routers 450 and another adaptable link 428*c* connecting the row of routers 450. (Omitted from the top-down view in FIG. 4C are the interposer switches 470, the adaptable links 428*b* that connect each column of routers 450 via each interposer switch 470, and the adaptable links 428*d* that connect each row of routers 450 via each interposer switch 470.) Each router 450 in FIG. 4C is electrically connected to one of the adaptable links 428*a* via two multiplexers 452 and the other adaptable link 428*a* via the other two multiplexers 452. (A router 450 at the end of the column (not shown) would be connected to the adaptable link 428*a* via only one multiplexer 452 and a router 450 at the end of a row (not shown) would be connected to the adaptable link 428*c* via only one multiplexer 452.)

Unlike conventional mesh links 224 or express links 328, which provide static connections between one predetermined router 150 and another predetermined router 150, the adaptable links 428 may be used to dynamically connect each router 450 to any of a number of other routers 450. For example, as shown in FIG. 4C, because the router 450*a* is connected to the adaptable link 428*a* via the multiplexer 452*a*, the adaptable link 428*a* may be used to dynamically connect the router 450*a* to either the router 450*c* (via the multiplexer 452*c*) or the router 450*d* (via the multiplexer 452*d*). Therefore, in contrast to conventional NoCs (and even existing reconfigurable NoCs), the adaptable links 428 and link switches 528 of the interconnection network 400 allow communication from one router 450 to be dynamically routed to any of a number of other routers 450.

Figure 5A:
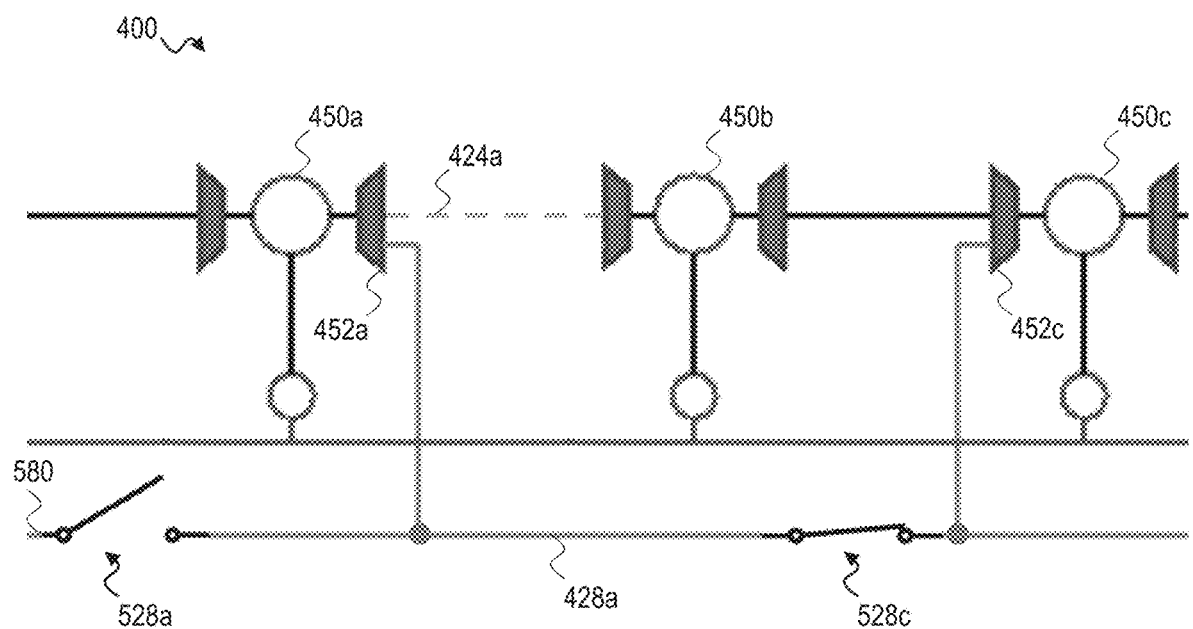
FIG. 5A is another cross-sectional view of the interconnection network according to an exemplary embodiment.

FIG. 5A is another cross-sectional view of the interconnection network 400 according to an exemplary embodiment.

The cross-sectional view shown in FIG. 5A includes three routers 450*a*, 450*b*, and 450*c*. The router 450*a* is connected to the mesh link 424*a* and the adaptable link 428*a* via the multiplexer 452*a*. However, in this example, the multiplexer 452*a* is enabling communication via the adaptable link 428*a* (rather than the mesh link 424*a*). The router 450*c* is also connected to the mesh link 424*a* via the multiplexer 452*c*.

The adaptable links 428 of the interconnection network 400 include link switches 528 that may be used to dynamically connect each router 450 to any of a number of other routers 450 in that row or column. For example, as shown in FIG. 5A, the adaptable link 428*a* includes link switches 528*a* and 528*c* that may be used to dynamically connect the router 450*a* to any of a number of other routers 450. The adaptable link 428*a* may connect the router 450*a* to the router 450*c* (via the multiplexer 452*c*) by closing the link switch 528*c*. Alternatively, the adaptable link 428*a* may connect the router 450*a* to another node (not shown) by opening the link switch 528*c* and closing the link switch 528*a*.

In order for the adaptable links 428 to dynamically change the connections between each router 450 and a number of other routers 450, a variety of different link connections are required between each of the routers 450. For example, in an 8×8 array of routers 450, each row and column requires at least 28 bi-directional links to cover all possible connections between routers 450 along that row or column. Forming 28 separate bidirectional links along each column and row would exhaust the limited available wiring resources.

Rather than forming 28 separate links, the adaptable links 428 of the interconnection network 400 are configured such that each adaptable link 428 may be used to connect more than two routers 450. Each adaptable link 428 is segmented into a series of short wires separated by the link switches 428. Link switches 528 along an adaptable link 428 may be closed to connect any two of the routers 450 along the adaptable link 428. (For instance, in the example above, the link switch 528*c* is closed to connect the router 450*a* to the router 450*c*.) At the same time, other link switches 528 may be opened, disconnecting the remaining portion of the adaptable link 428. That disconnected portion of the adaptable link 428 may then be used to connect an additional two routers 450 along that portion of the adaptable link 428. In the example shown in FIG. 5A, for instance, the link switch 528*a* is opened to allow the segment 580 of the adaptable link 428*a* to be used to connect other routers 450 along the adaptable link 428*a*.

Figure 5B:
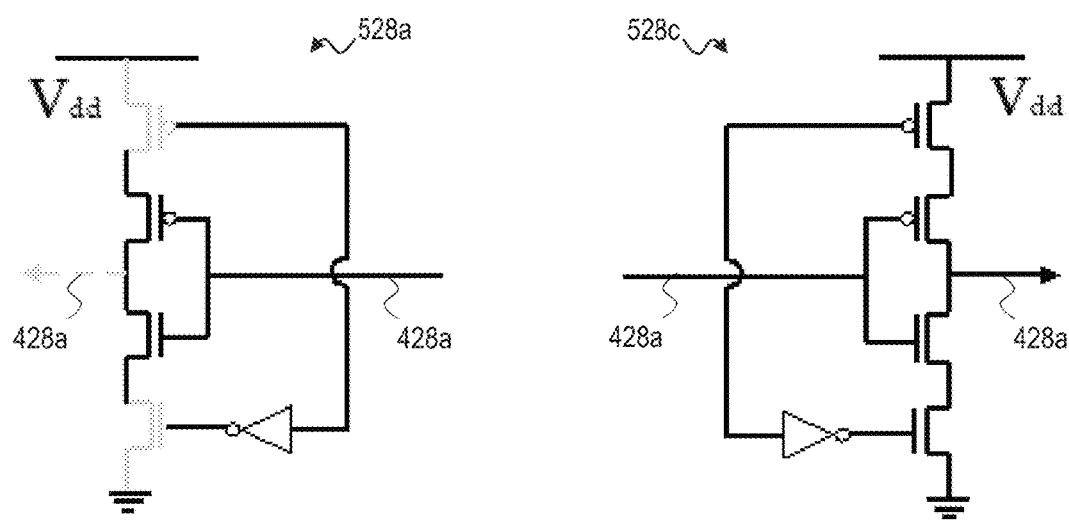
FIG. 5B are schematic diagrams of the two link switches and according to an exemplary embodiment.

FIG. 5B are schematic diagrams of the two link switches 528*a* and 528*c* according to an exemplary embodiment.

Because each adaptable link 428 may be used to form multiple connections between multiple pairs of routers 450, there is a need for each open link switch 528 to segment the adaptable link 428 to avoid signal interference when multiple signals are propagating on the same adaptable link 428. As shown in FIG. 5B, each link switch 528 may be a tri-state transistor that cuts off signal propagation to avoid signal interference. In response to an off signal, the tri-state transistor of the link switch 528 is disconnected from Vdd and ground, thereby terminating the data transmission along the adaptable link 428*a*. In response to an on signal, the tri-state transistor is reconnected to Vdd and ground. Having been reconnected to Vdd and ground, the tri-state transistor resumes the data transmission between the two routers 450 along the adaptable link 428 and functions as a link repeater. In FIG. 5B, for example, the tri-state transistor of the link switch 528*a* is disconnected from Vdd and ground, thereby terminating data transmission between the two segments of the adaptable link 428*a* connected to the link switch 528*a*. Meanwhile, the tri-state transistor of the link switch 528*a* is connected to Vdd and ground, thereby causing the link switch 528*c* to function as a link repeater and transmit data along the two segments of the adaptable link 428*a* connected to the link switch 528*c*. The tri-state transistor is particularly effective at preventing signal interference because, in response to an off signal, the output port tri-state transistor output port assumes a high impedance state. Rather than simply opening the circuit, the high impedance effectively removes the output from the circuit, preventing signal interference and allowing multiple circuits to use the same adaptable link 428*a*.

Figure 6:
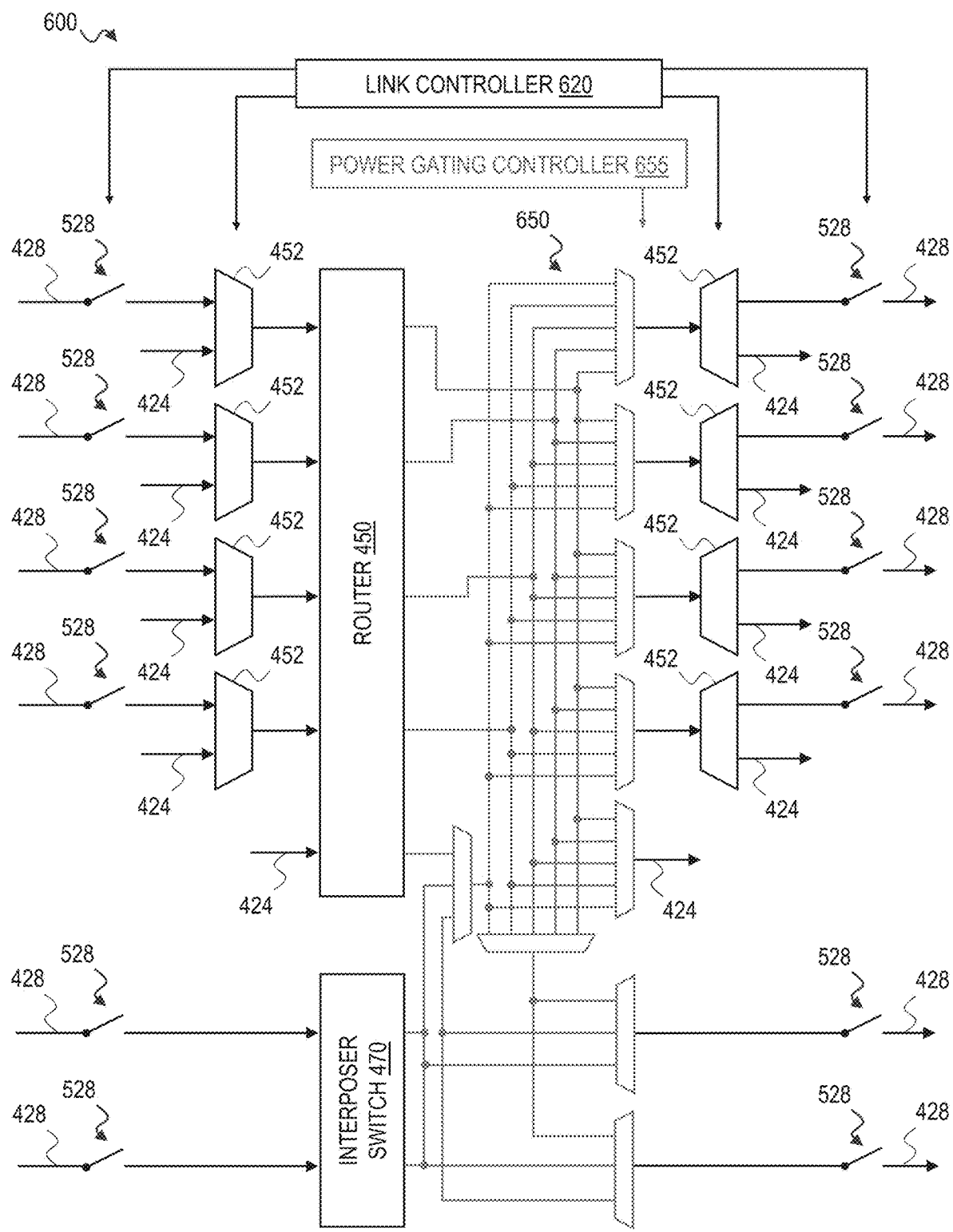
FIG. 6 is a block diagram of the microarchitecture of an adaptable router according to an exemplary embodiment.

FIG. 6 is a block diagram of the microarchitecture of an adaptable router 600, which includes one of the routers 450 electrically connected to one of the interposer switches 470, according to an exemplary embodiment.

The adaptable router 600 provides the desired router radix and connections with other routers 450. As mentioned above, the router 450 is electrically connected to mesh links 424 and adaptable links 428 via multiplexers 452. The router 450 is also electrically connected to additional adaptable links 428 via the interposer switch 470. The adaptable router 600 also includes a link controller 620 that controls the link switches 528 and the multiplexers 452.

The router 450 may be electrically connected to the interposer switch 470 by a set of multiplexers 650. As such, the router 450 can compose a high-radix router along with the interposer switch 470. In the example shown in FIG. 6, a 5×5 router 450 is electrically connected to 2×2 interposer switch 470 by a set of multiplexers 650 that includes six 5-to-1 multiplexers and three 3-to-1 multiplexers. However, other arrangements may be used. Compared to a conventional router 150 (e.g., an 8×8 router), the adaptable router 600 reduces the radix of the router 450, mitigates the hop count at the interposer 480, and is able to compose a high-radix router when required. When the interposer switch 470 operates independently, it functions as a bypass switch to support the core-router, inter-router data transmissions. Therefore, to avoid buffer delays when packets bypass the router 450, bypass links are added to virtual channels of the interposer switch 470 and network interface. The adaptable router 600 also includes a power-gating controller 655 that powers off unused ports and crossbars, reducing static power consumption.

The interconnection network 400 may also be used to reconfigure some or all of the nodes within a chiplet-based architecture to form any of a variety of different topologies.

Figure 7A:
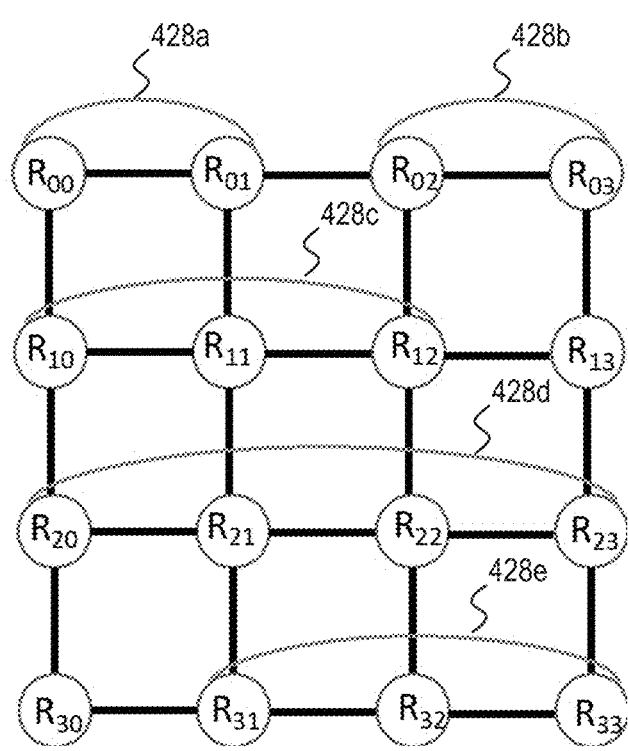
FIG. 7A is a diagram of a custom topology implemented using the interconnection network according to an exemplary embodiment.

FIG. 7A is a diagram of a custom topology 700 implemented using the interconnection network 400 according to an exemplary embodiment.

As shown in FIG. 7A, the custom topology 700 includes an array of routers 450, individually designated $R_{00}$ through $R_{33}$. Using the interconnection network 400 described above, customized connections may be routed between non-adjacent routers 450. In the example shown in FIG. 7A, an adaptable link 428a connects router $R_{00}$ and router $R_{01}$, an adaptable link 428b connects router $R_{02}$ and router $R_{03}$, an adaptable link 428c connects router $R_{10}$ and router $R_{12}$, an adaptable link 428d connects router Rao and router $R_{23}$, and an adaptable link 428e connects router $R_{31}$ and router $R_{33}$.

Figure 7B:
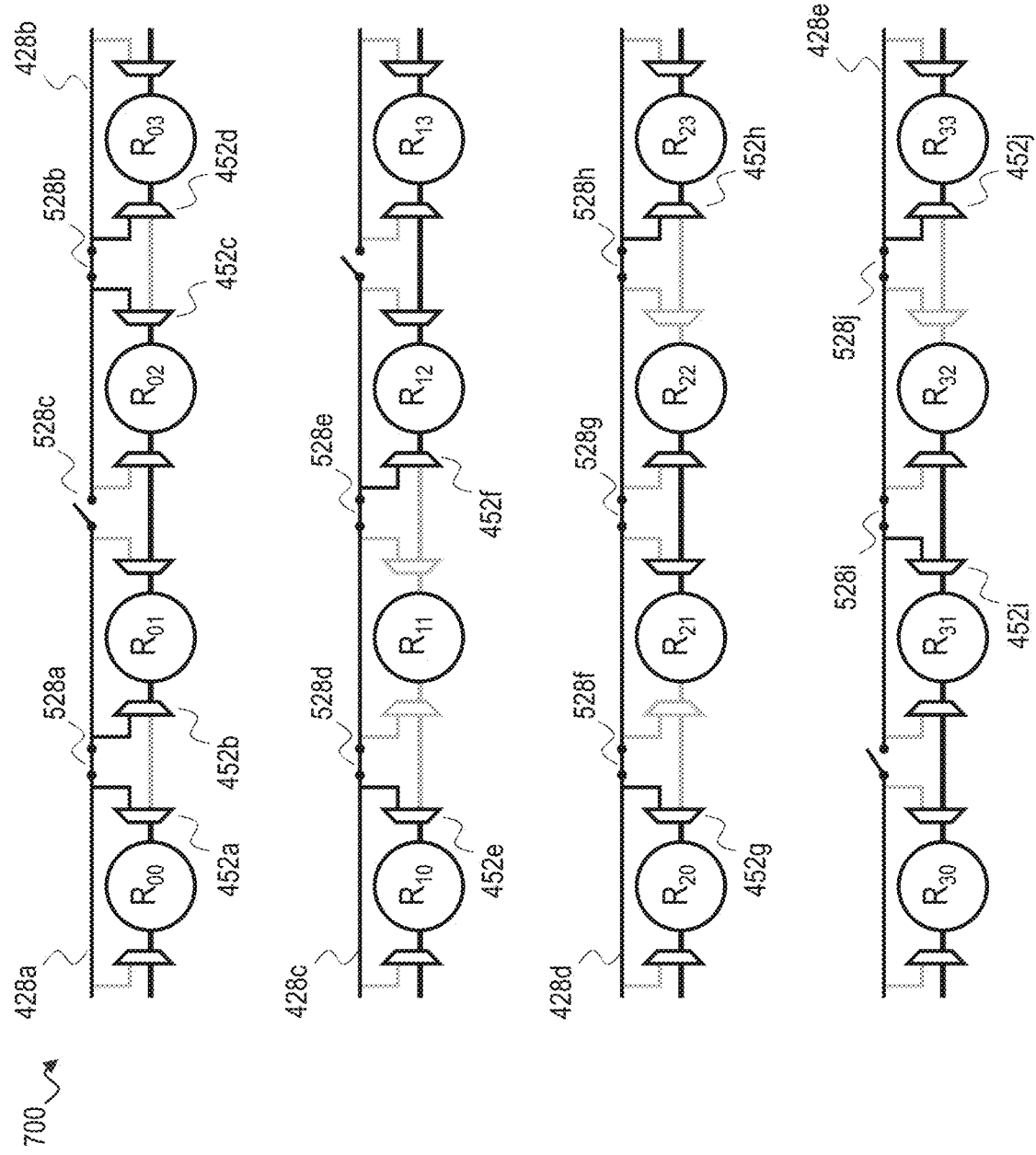
FIG. 7B is a diagram of the custom topology of FIG. 7A implement using the adaptable links and link switches according to an exemplary embodiment.

FIG. 7B is a diagram of the custom topology 700 implemented using the adaptable links 428 and link switches 528 according to an exemplary embodiment.

As shown in FIG. 7B, the adaptable link 428a connects router $R_{00}$ and router $R_{01}$ via multiplexers 452a and 452b. The adaptable link 428a extends from router $R_{00}$ to router $R_{01}$ by closing link switch 528a. Similarly, the adaptable link 428b connects router $R_{02}$ and router $R_{03}$ via multiplexers 452c and 452d and closed link switch 528d. Notably, the same adaptable link 428 (along the top row of routers $R_{00}$ through $R_{03}$) may be segmented and used as both the adaptable link 428a and the adaptable link 428b by opening the link switch 528c.

The adaptable link 428c connects router $R_{10}$ and router $R_{12}$ via multiplexers 452e and 452f and closed link switches 528d and 528e. The adaptable link 428d connects router $R_{20}$ and router $R_{23}$ via multiplexers 452g and 452h and closed link switches 528f, 528g, and 528h. Finally, the adaptable link 428e connects router $R_{31}$ and router $R_{33}$ via multiplexers 452i and 452j and closed link switches 528i and 528j.

While the adaptable links 428 of the custom topology 700 of FIG. 7A are shown in FIG. 7B as being connected to each router 450 via the multiplexers 452, the interconnection network 400 also provides functionality for adaptable links 428 to connect routers 450 via the interposer switches 470 as described above.

Figure 8:
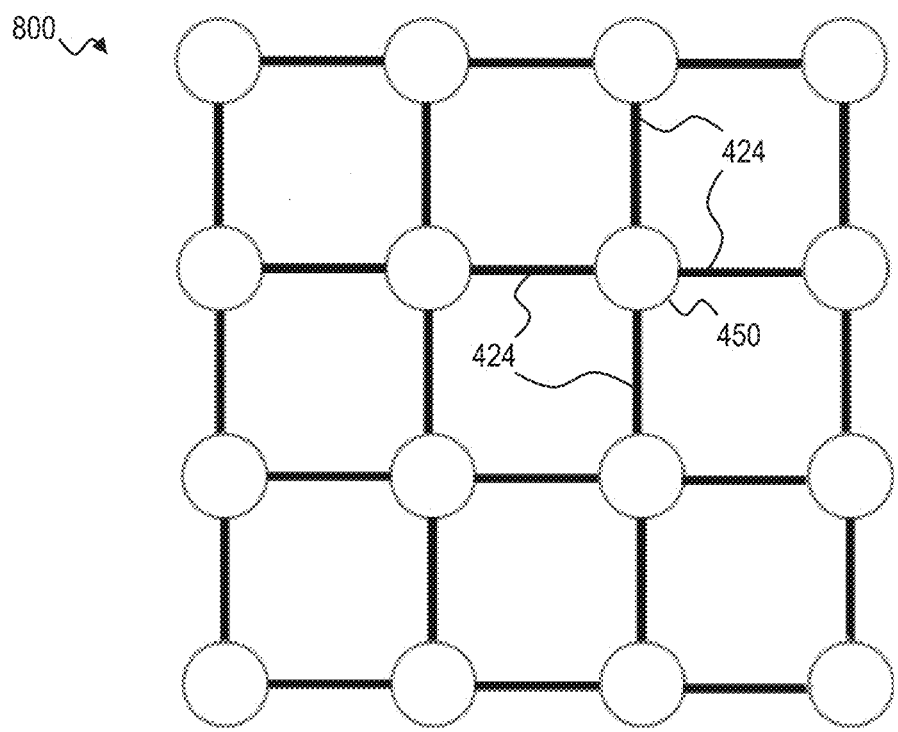
FIG. 8 is a diagram of a mesh topology implemented using the interconnection network according to an exemplary embodiment.

FIG. 8 is a diagram of a mesh topology 800 implemented using the interconnection network 400 according to an exemplary embodiment.

As shown in FIG. 8, the mesh topology 800 includes an array of routers 450 with mesh links 424 between each adjacent router 450. If the mesh topology 800 would be beneficial to perform an application, some or all of the nodes of the interconnection network 400 may be reconfigured to form the mesh topology 800.

Figure 9:
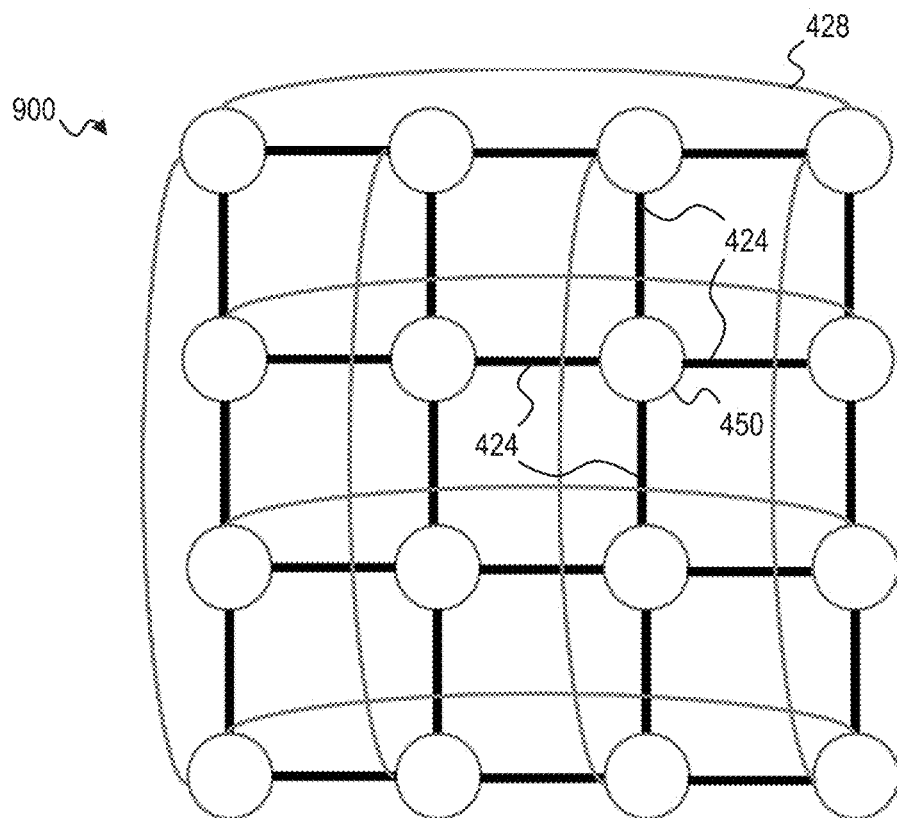
FIG. 9 is a diagram of a torus topology implemented using the interconnection network according to an exemplary embodiment.

FIG. 9 is a diagram of a torus topology 900 implemented using the interconnection network 400 according to an exemplary embodiment.

As shown in FIG. 9, the torus topology 900 includes an array of routers 450 with mesh links 424 between each adjacent router 450. In the torus topology 900, adaptable links 428 connect the peripheral routers 450 horizontally and vertically by forming wrap-around express links. If the torus topology 900 would be beneficial to perform an application, some or all of the interconnection network 400 may be reconfigured to form the torus topology 900, which reduces the network diameter (improving network latency) and increase the number of links 424 and 428 across the network, improving bi-section bandwidth and throughput.

Figure 10A:
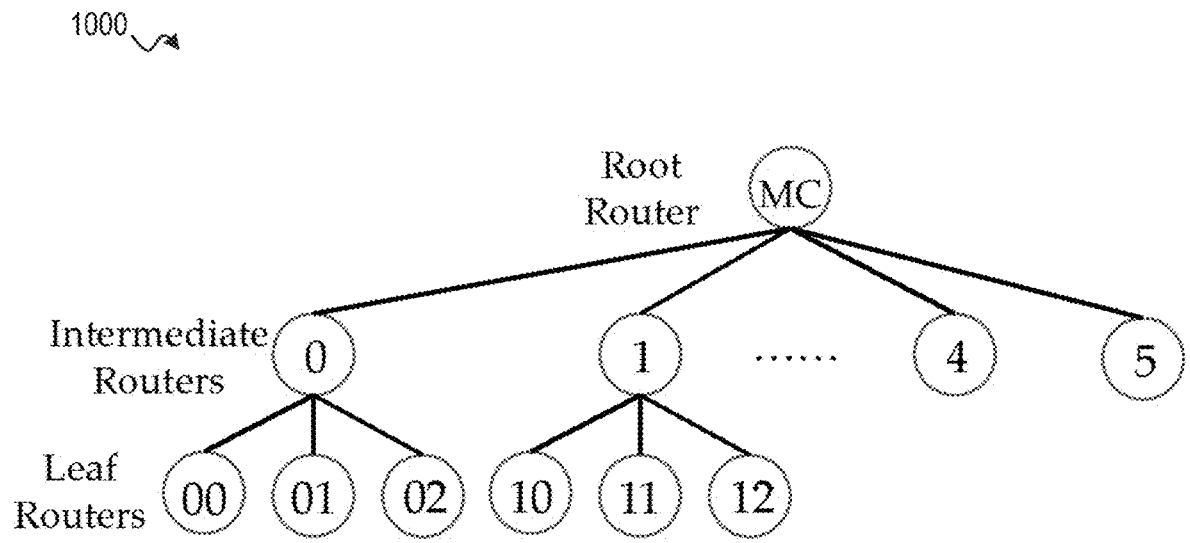
FIG. 10A is a diagram of the logical connections of a tree topology.
Figure 10B:
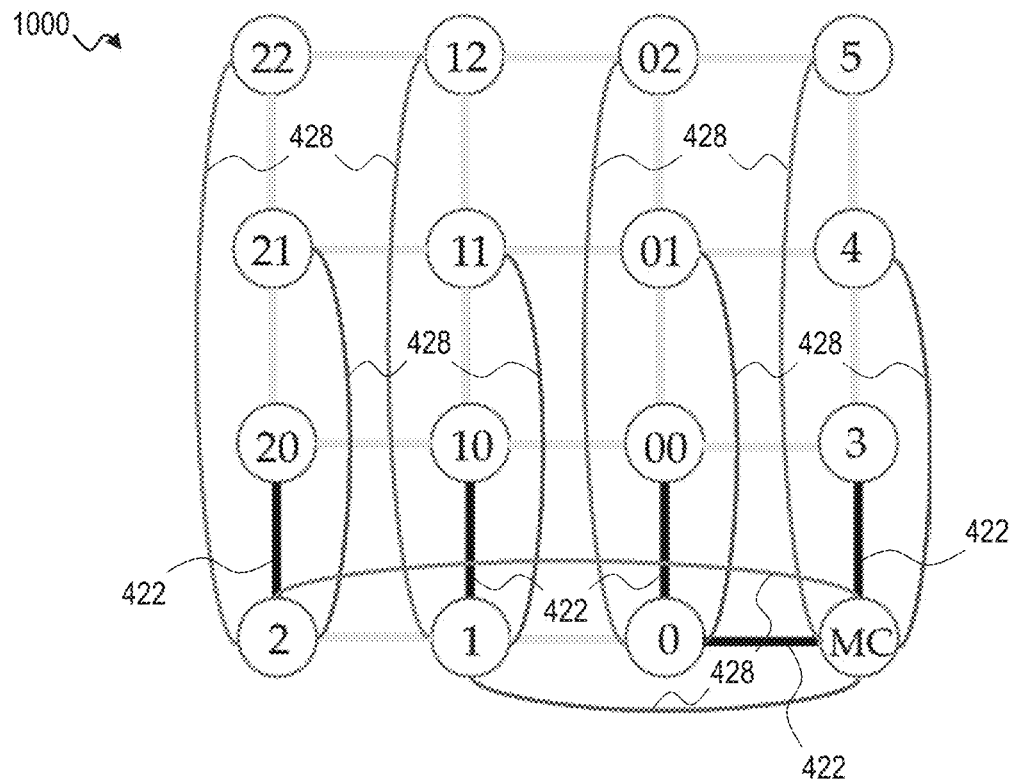
FIG. 10B is a diagram of the physical connections of the tree as implemented using the interconnection network according to an exemplary embodiment.

FIG. 10A is a diagram of the logical connections of a tree topology 1000. FIG. 10B is a diagram of the physical connections of the tree topology 1000 as implemented using the interconnection network 400 according to an exemplary embodiment.

As shown in FIG. 10A, the tree topology 1000 includes a root router (memory controller) connected to intermediate routers 0 through 5. Intermediate router 0 is connected to leaf routers 00 through 02. And intermediate router 1 is connected to leaf routers 10 through 12.

As shown in FIG. 10B, for example, a router 450 in the corner of the interconnection network 400 may be used as the root router (memory controller) and may be connected to intermediate routers 450 along the peripheral edge of the interconnection network 400 via the mesh links 422 connected to that corner node and the adaptable links 428 connected to that corner node. The intermediate routers 450 along the peripheral edge of the interconnection network 400 may then be connected to leaf routers 450 (for example routers in the same row or column) via mesh links 422 and adaptable links 428 connected to that peripheral node.

As shown specifically in FIG. 10B, the root router (memory controller) is connected to intermediate routers 0 and 3 via mesh links 422 and to intermediate routers 1-2 and 4-5 via adaptable links 428. Intermediate router 0 is connected to leaf router 00 via a mesh link 422 and leaf nodes 01 and 02 via adaptable links 428. Intermediate router 1 is connected to leaf router 10 via a mesh link 422 and leaf routers 11 and 12 via adaptable links 428. Finally, intermediate router 2 is connected to leaf router 20 via a mesh link 422 and leaf routers 21 and 22 via adaptable links 428.

The heavy reply traffic (e.g. one-to-many traffic) from the memory controller (MC) has been identified as a bottleneck of NoC performance in the throughput processor. The intensive reply traffic results in packet congestion at the injection port, which significantly increases the queuing latency. Such undesirable congestion results from insufficient injection bandwidth and poor load balance in grid-like topologies, such as the mesh topology 700. The tree topology 1000 is configured as a reply network, providing high injection bandwidth at the memory controller (the root node) and balanced load distribution. Specifically, the fanout of the root router 450 (the memory controller) is maximized to provide high injection bandwidth, where the reply packets from the root router are directly injected to the input buffers of the intermediate routers 450. Furthermore, the root and intermediate routers 450 are connected with their downstream routers 450, vertically and horizontally to evenly distribute the reply traffic.

In the example shown in FIG. 10B, the root router 450, intermediate routers 450, and leaf routers 450 are fully connected by a set of links (mesh links 422 and adaptable links 428), horizontally and vertically. Such link connections are designed to couple with dimensional routing (generic routing algorithm). Consequently, in the illustrated example, the reply traffic from the memory controller can be delivered to all routers 450 within two hops. Note that the request traffic still goes through the mesh topology. This implementation demonstrates the capability to efficiently handle one-to-many traffic patterns in the throughput processors.

While the example shown in FIG. 10B is a fully connected tree topology 1000, the tree suffers from scalability issues when the network size increases. In the case of large network size, the same design principle may be followed to maximize injection bandwidth and distribute reply packets. The fanout of the root router 450 may still be maximized, but the root router 450 and intermediate routers 450 may be connected with their downstream routers 450 at an evenly spaced distance in each row/column.

As described above, in preferred embodiments, the routers 450 are arranged in an array with each router 450 being connected to each adjacent routers 450 via a mesh link 424. However, as one of ordinary skill in the art would recognize, the routers 450 may be arranged in other ways with other direct connections connecting nearby nodes.

Additionally, in the preferred embodiments described above, the adaptable links 428 of the interconnection network 400 are formed as part of an interposer 480 and each router 450 is connected to two of the four available adaptable links 428 via an interposer switch 470. However, the adaptable links 428 of the interconnection network 400 may be realized in other ways. For example, the interconnection network 400 may not employ an interposer 480. Additionally or alternatively, each router 450 may be a larger-radix router that does not require an interposer switch 470 to connect to two of the adaptable links 428.

While interposer switches 470 may not be required in all embodiments, the interposer switches 470 described above provide specific technical benefits, including functionality to provide network concentration.

Figure 11:
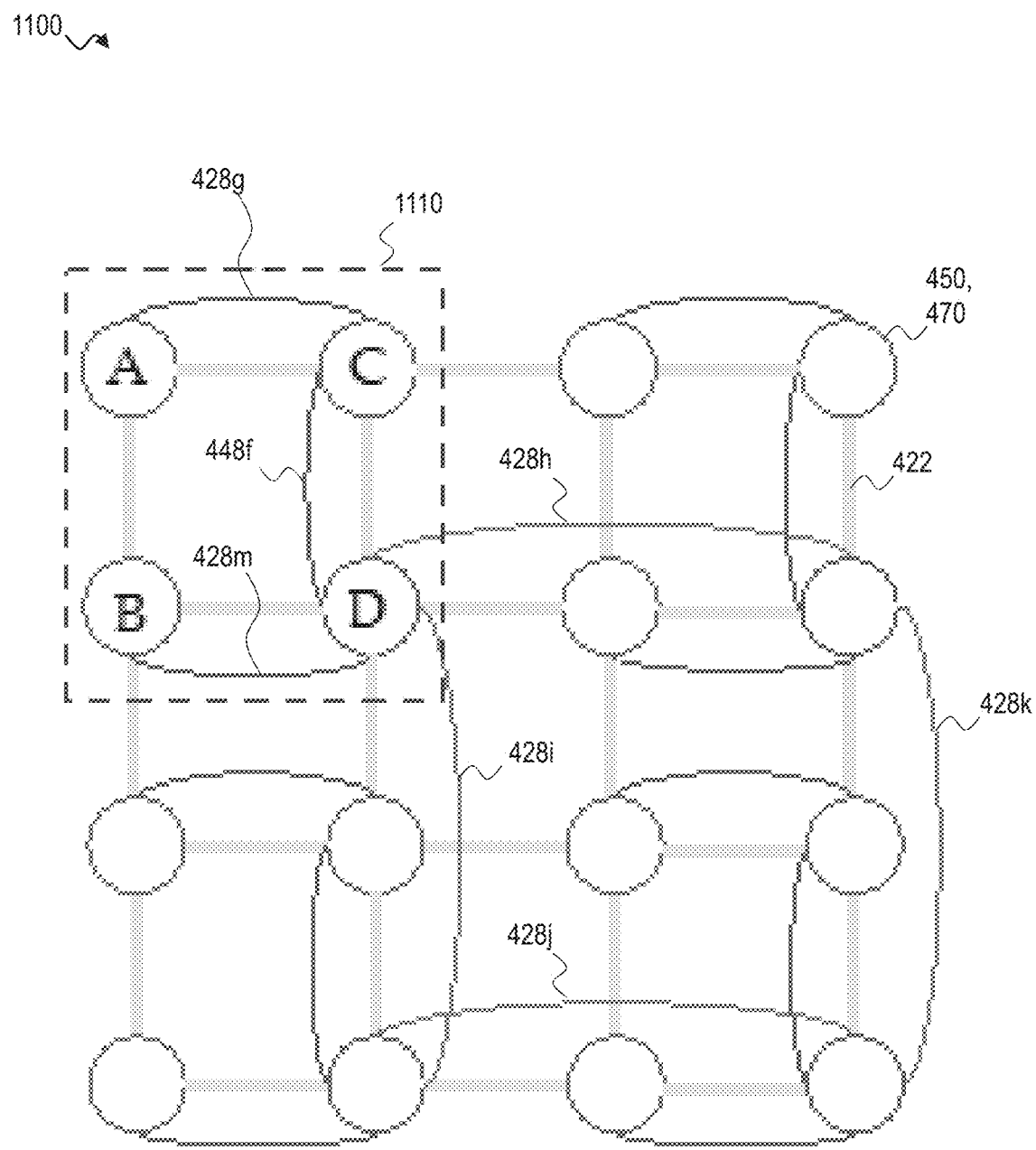
FIG. 11 is a diagram of a cmesh topology implemented using the interconnection network according to an exemplary embodiment.

FIG. 11 is a diagram of a cmesh topology 1100, implemented using the interconnection network 400 according to an exemplary embodiment, which provides network concentration.

Connecting multiple nodes to a single router 450 (referred to as "network concentration") can effectively reduce the network diameter by using fewer routers 450. Previous designs relied on high-radix routers 150 or external arbitration logic to realize the network concentration. However, those prior art designs are difficult to implement in the configured network due to insufficient router radix and inflexibility of external arbitration (fixed grant and request signals). Therefore, the interconnection network 400 implements the network concentration by utilizing the interposer switch 470.

The cmesh topology 1100 shown in FIG. 11 is a 2×2 cmesh topology, where four cmesh routers 450 are connected to sixteen nodes. As described above, each cmesh router 450 includes an interposer switch 470 connected to adaptable links 428. While each node is connected to its adjacent nodes via mesh links 422, those mesh links are not utilized in the cmesh topology 1100. Instead, cmesh router 450 (e.g., node D) connects to four nodes in a concentrated region 1110 (e.g., nodes A, B, C and itself) via its interposer switch 470 using adaptable links 428. Within each of the four concentrated regions, the injection ports of nodes B and C, which are adjacent to node D, are connected to the interposer switch 470 of node D using adaptable links 428*m* and 448*f*. Since interposer switch 470 of node D has been fully connected by nodes B and C, node A cannot directly connect to node D. In that case, node A connects to node D through the interposer switch 470 of node C using the adaptable link 428*g*.

Using the interposer switches 470 and adaptable links 428 rather than mesh links 522 provides important technical benefits. For example, when packet contention happens between nodes A and C, the interposer switch 470 at node A can buffer the packets to the interposer switch 470 of node C. This avoids fixed grant and request signals required by the external arbitration.

The nodes of other three concentrated regions are similarly connected via the interposer switches 470 of those nodes. Meanwhile, adaptable links 428*h* through 428*k* provide express links that connect non-adjacent routers. Therefore, as shown in FIG. 11, the cmesh topology 700 connects four cmesh routers 450 to sixteen nodes. If the network concentration would be beneficial to perform an application, some or all of the interconnection network 400 may be reconfigured to form the cmesh topology 1100, which reduces network latency (by reducing the diameter of the network) and reduces power consumption (by using fewer routers 450).

The interconnection network 400 may also be dynamically reconfigured such that interconnection network 400 is partitioned to form multiple topologies (subNoCs). By partitioning the interconnection network 400, a collection of cores 160, memory modules, routers 450, and links 422 and 428 within different regions of the manycore architecture may be allocated to different applications running concurrently. Computing and memory resources within each region may be efficiently allocated by modifying cache coloring, page replacement, and mapping policy, and thus the data is placed closer to the computation. As a result, the application can take full advantage of data locality and mitigate inter-application interference. The interconnection network 400 may form multiple topologies that are specifically adapted to run multiple applications running concurrently.

Figure 12:
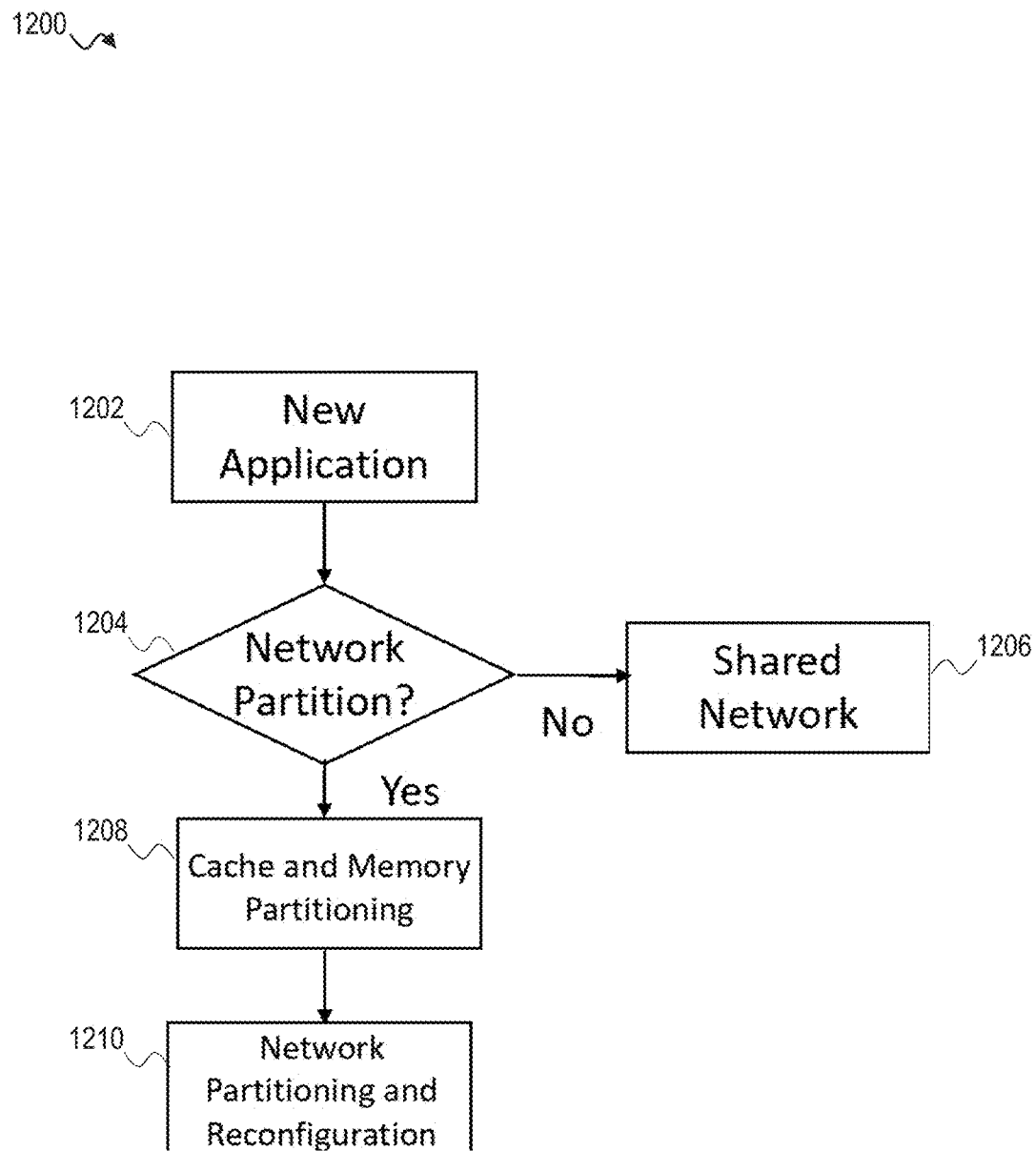
FIG. 12 is a flow chart illustrating a process for partitioning the interconnection network according to an exemplary embodiment.

FIG. 12 is a flow chart illustrating a process 1200 for partitioning the interconnection network 400 according to an exemplary embodiment.

An instruction is received to open a new application in step 1202. The processing unit determines the application mapping, including whether to partition the interconnection network 400, based on a mapping policy in step 1204. In response to a determination not to partition the interconnection network 400 (Step 1204: No), the interconnection network 400 is shared in step 1206. In response to a determination to partition the interconnection network 400 (Step 1204: Yes), cache and memory partitioning is performed in step 1208. The interconnection network 400 is partitioned and the new partition is reconfigured in step 1210. Because the new partition will be allocated to perform the new application (introduced in step 1202), the new partition may be reconfigured to form a topology (e.g., the mesh topology 700, the torus topology 900, the tree topology 1000, the cmesh topology 1100, etc.) specifically beneficial for the new application.

Figure 13:
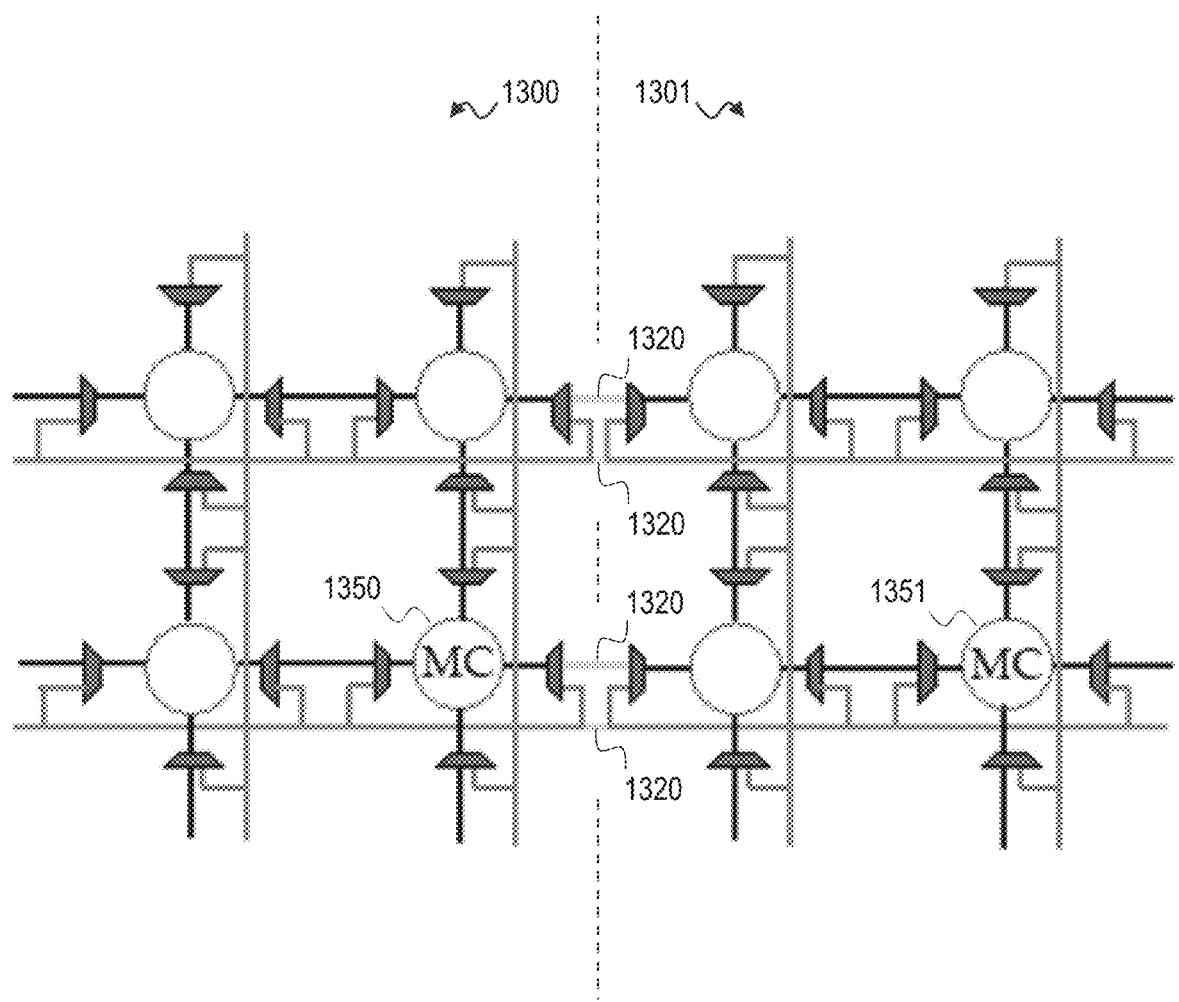
FIG. 13 is a diagram of the interconnection network partitioned into subNoCs according to an exemplary embodiment.

FIG. 13 illustrates subNoC partitions 1300 and 1301 implemented by the interconnection network 400 according to an exemplary embodiment.

For memory controller (MC) implementation, a memory controller should be available to each subNoC 1300 and 1301 to support cache-memory communication. Therefore, the interconnection network 400 may include one memory controller for each subNoC. As shown in FIG. 13, for instance, the subNoC 1300 includes a memory controller 1350 and the subNoC 1301 includes an independent memory controller 1351. While each subNoC is assigned with an independent memory controller, the memory controller for that subNoC may not be sufficient for memory intensive applications. To address this issue, the interconnection network 400 may facilitate memory controller sharing, in which each memory controller may be shared by up to four subNoCs. As shown in FIG. 13, for example, if the application running on subNoC 1301 demands additional memory bandwidth, the subNoC 1301 may connect with the memory controller 1350 of the subNoC 1300 using the unused ports 1320 of the peripheral routers 450 in both subNoCs 1300 and 1301. Moreover, the interposer switches 470 may also provide inter-subNoC communication.

Network deadlock may occur due to improper subNoC switching, protocol deadlock, or circular channel dependence. Therefore, to avoid the misrouting of packets, the interconnection network 400 may be configured to refrain from altering a subNoC size or topology until all in-flight packets are drained. Furthermore, the interconnection network 400 may be configured to avoid protocol deadlock by using multiple virtual networks. Although the interconnection network 400 may be configured to use dimensional-order routing for the mesh topology 700, the cmesh topology 1100, and the torus topology 900, circular channel dependence is inevitable in each tori. A number of techniques have been proposed to solve the deadlock in ring and tori. However, the interconnection network 400 may utilize the simple yet effective dateline to avoid such circular channel dependence. Since the prerequisite of forming circular channel dependence is that a given router 450 is connected to at least two other routers 450, the fact that each MC is only allowed to connect to one router 450 of any subNoC precludes the formation of cyclic dependency within any subNoC.

The topology of the interconnection network 400 (or a partition of the interconnection network 400) may be dynamically selected based on the characteristics of the application being performed by the interconnection network 400 or partition. The selection policy may be a simple control logic, a heuristic algorithm, or a machine learning-based algorithm. Any of those policies may be used to categorize an application based on latency sensitivity and/or bandwidth sensitivity. The application categorization may be based on application features, such as traffic and memory behaviors. For example, an application with sparse or sporadic communication traffic may benefit from a concentrated network topology, such as the cmesh topology 1100, to reduce the network latency and reduce power. Alternatively, applications with intensive traffic may benefit from a topology with optimized express links, such as the torus topology 900, where the rich network connectivity can provide increased network bandwidth and reduce latency. Memory intensive applications with a large amount of memory access may benefit from a topology with increased injection bandwidth and increased network bi-section, such as the tree topology 91000 00.

Figure 14:
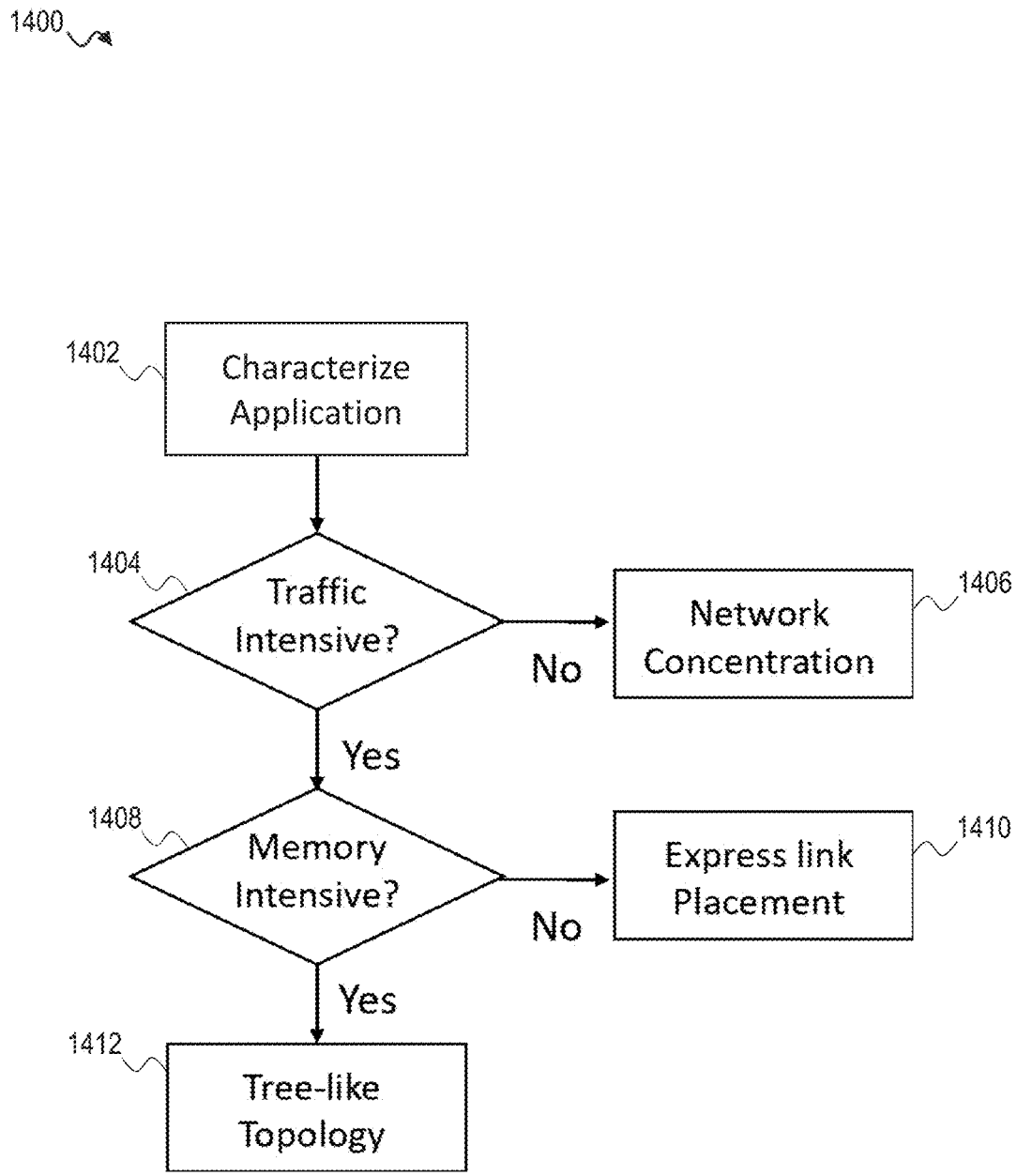
FIG. 14 is a flowchart illustrating a process for selecting a topology for the interconnection network (or a partition of the interconnection network) according to an exemplary embodiment.

FIG. 14 is a flowchart illustrating a process 1400 for selecting a topology for the interconnection network 400 (or a partition of the interconnection network 400) according to an exemplary embodiment.

The processing unit characterizes the application in step 1402. As mentioned above, the characterization process may be performed using control logic, a heuristic algorithm, or a machine learning-based algorithm.

Regardless of the characterization process used, a determination is made in step 1404 as to whether the application is traffic intensive. If the application is not traffic intensive (step 1404: No), network concentration may be performed in step 1406, for example by reconfiguring the interconnection network 400 (or the portion of the interconnection network 400 to be used to execute the application) to implement the cmesh topology 1100.

If the application is traffic intensive (step 1404: Yes), a determination is made in step 1408 as to whether the application is memory intensive. If the application is not memory intensive (step 1408: No), express links may be placed in step 1410, for example by reconfiguring the interconnection network 400 (or the portion of the interconnection network 400 to be used to execute the application) to implement the torus topology 900.

If the application is both traffic intensive (step 1404: Yes) and memory intensive (step 1408: Yes), the interconnection network 400 (or the portion of the interconnection network 400 to be used to execute the application) may be reconfiguring in step 1412 to implement a tree-like topology, such as the tree topology 1000.

The subNoC formation process 1000 can be generalized to include more topologies, including different configurations of network concentration, express link placements, and combined topologies. For example, the torus topology 900 and tree topology 1000 may be combined together to simultaneously optimize both request and reply networks for memory-intensive applications. Moreover, the wrap-around links in the torus topology 1000 may be segmented to several short express links to bypass routers 450.

This disclosure focuses on four popular topologies (the mesh topology 700, the torus topology 900, the tree topology 1000, and the cmesh topology 1100) to demonstrate the performance and energy benefits of simultaneously deploying different subNoC topologies. However, the interconnection network 400 is not limited in that regard and may be dynamically reconfigured to form any of a number of topologies.

The foregoing description and drawings should be considered as illustrative only of the principles of the disclosure, which may be configured in a variety of shapes and sizes and is not intended to be limited by the embodiment herein described. Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

What is claimed is:

1. An on-chip interconnection network for a processing unit having a plurality of cores, the on-chip interconnection network comprising:
   a plurality of routers, each connected to one or more of the cores;
   a plurality of multiplexers connected to each router;
   a plurality of mesh links, each mesh link connecting adjacent routers via the multiplexers;
   a plurality of adaptable links, each adaptable link connecting multiple routers via multiplexers connected to the multiple routers; and
   a link controller configured to:
   dynamically partition the on-chip interconnection network;

select, from a plurality of topologies, a topology for each partition of the on-chip interconnection network; and dynamically connect the routers of each partition of the on-chip interconnection network to form the selected topology by controlling each multiplexer to selectively connect the router connected to the multiplexer to either one of the plurality of mesh links or one of the plurality of adaptable links.

2. The interconnection network of claim 1, wherein:
the routers arranged in rows and columns; and
the adaptable links include:
a first plurality of adaptable links, each connecting routers along one of the rows via the multiplexers connected to the routers along the row; and
a second plurality of adaptable links, each connecting routers along one of the columns via the multiplexers connected to the routers along the column.

3. The interconnection network of claim 1, further comprising:
link switches along each adaptable link, each link switch being between connections to two of the routers selectively connected to the adaptable link,
wherein the link controller controls the multiplexers and the link switches to selectively connect routers via the adaptable links.

4. The interconnection network of claim 3, wherein each of the link switches are configured to open and close, each open link switch along each adaptable link segmenting the adaptable link into two segments, each segment providing functionality to selectively connect two of the routers.

5. The interconnection network of claim 2, further comprising:
an interposer comprising:
a plurality of interposer switches, each interposer switch being connected to one of the routers,
a third plurality of adaptable links, each connecting routers along one of the rows via the interposer switches connected to the routers along the row; and
a fourth plurality of adaptable links, each connecting routers along one of the columns via the interposer switches connected to the routers along the column; and,
wherein the link controller controls the multiplexers and the interposer switches to selectively connect routers via the mesh links and the adaptable links.

6. The interconnection network of claim 5, further comprising:
link switches along each adaptable link, each link switch being between connections to two of the routers selectively connected to the adaptable link,
wherein the link controller controls the multiplexers, the interposer switches, and the link switches to selectively connect routers via the mesh links and the adaptable links.

7. The interconnection network of claim 6, wherein each of the link switches are configured to open and close, each open link switch along each adaptable link segmenting the adaptable link into two segments, each segment providing functionality to selectively connect two of the routers.

8. The interconnection network of claim 1, wherein the processing unit selects the topology for each partition based on characteristics and demands of a software application to be executed by the partition.

9. The interconnection network of claim 8, wherein the characteristics and demands of the software application include traffic intensiveness, memory intensiveness, network latency, throughput, or power consumption.

10. The interconnection network of claim 9, wherein, in response to a determination that the software application is not traffic intensive, the link controller reconfigures the partition to perform network concentration.

11. The interconnection network of claim 10, wherein the link controller performs network concentration by the reconfiguring the partition to form a cmesh topology or other concentrated topology where multiple cores are connected to a single router.

12. The interconnection network of claim 9, wherein, in response to a determination that the software application is traffic intensive and a determination that the software application is not memory intensive, the link controller reconfigures the partition to place express links between non-adjacent routers and form a torus topology or other express link placement that electrically connects a pair of non-adjacent routers with the most intensive communications.

13. The interconnection network of claim 9, wherein, in response to a determination that the software application is traffic intensive and determination that the software application is memory intensive, the link controller reconfigures the partition to form a tree topology or other topology supporting a one-to-many communication pattern.

14. The interconnection network of claim 9, wherein, in response to a determination that certain topology can fulfill the demands of the software application in terms of network latency, network throughput, or power consumption, the link controller reconfigures the partition to form the most beneficial topology including any regular and irregular communication paths.

15. A method of dynamically reconfiguring an interconnection network that includes a plurality of cores, a router connected to each one, a plurality of multiplexers and an interposer switch connected to each router, mesh links connecting adjacent routers via the multiplexers, adaptable links connecting multiple routers via the multiplexers, and adaptable links connecting multiple routers via the interposer switches, the method comprising:
analyzing a software application to be executed by a new partition to determine whether the software application is traffic intensive;
analyzing the software application to determine whether the software application is memory intensive;
partitioning the interconnection network to include the new partition; and
in response to a determination that the software application is not traffic intensive, reconfiguring the new partition to perform network concentration by controlling the multiplexers and/or interposer switches to connect multiple cores to a single router; or
in response to a determination that the software application is traffic intensive and a determination that the software application is not memory intensive, reconfiguring the new partition by controlling the multiplexers and/or interposer switches to connect non-adjacent routers via the adaptable links.

16. The method of claim 15, wherein the network concentration is performed to form a cmesh topology.

17. The method of claim 15, wherein the non-adjacent routers are connected to form a torus topology.

18. The method of claim 15, wherein the software application is analyzed using control logic, a heuristic algorithm, or a machine learning-based algorithm.

19. The method of claim 15, further comprising:
analyzing the software application to determine latency sensitivity, bandwidth sensitivity, network latency, throughput, or power consumption;
reconfiguring the new partition based on the determined latency sensitivity, bandwidth sensitivity, network latency, throughput, or power consumption of the software application.

20. The interconnection network of claim 5, wherein multiple chiplets are stacked on the interposer, each chiplet including one or more of the plurality of cores.

21. The interconnection network of claim 5, wherein each router and interposer switch form an adaptable router.

22. An on-chip interconnection network for a processing unit having an array of chiplets on an interposer, each chiplet including a plurality of cores, the on-chip interconnection network comprising:
a plurality of routers, each connected to one or more of the cores;
a plurality of multiplexers connected to each router;
a plurality of mesh links, each mesh link connecting adjacent routers via the multiplexers;
a plurality of chiplet-level adaptable links, each chiplet-level adaptable link connecting multiple routers via multiplexers connected to the multiple routers;
an interposer switch connected to each router;
a plurality of interposer-level adaptable links, each interposer-level adaptable link connecting multiple routers via interposer switches connected to the multiple routers;
a link controller configured to:
select a topology from a plurality of topologies; and
dynamically connect the routers to form the selected topology by:
controlling at least some of the multiplexers to selectively connect the router connected to the multiplexer to either one of the plurality of mesh links or one of the plurality of chiplet-level adaptable links; and
controlling at least some of the interposer switches to selectively connect multiple routers via the interposer-level adaptable links.

23. The interconnection network of claim 22, wherein the link controller is configured to:
dynamically partition the on-chip interconnection network; and
dynamically connect the routers of a partition to form the selected topology.

* * * * *